D. F. O'BRIEN.
BRANCH PIPE CONNECTION.
APPLICATION FILED NOV. 6, 1913.
1,185,927.
Patented June 6, 1916.
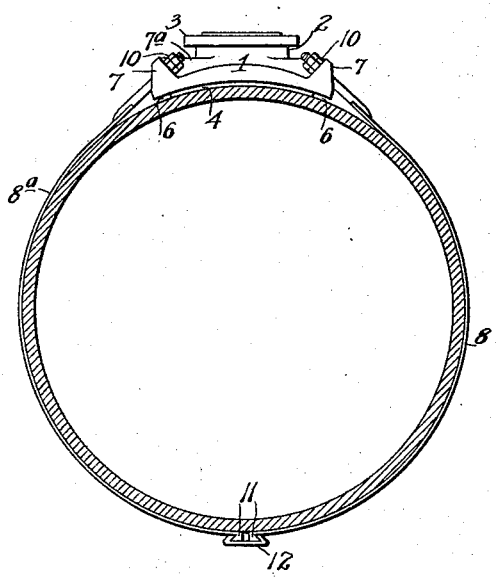
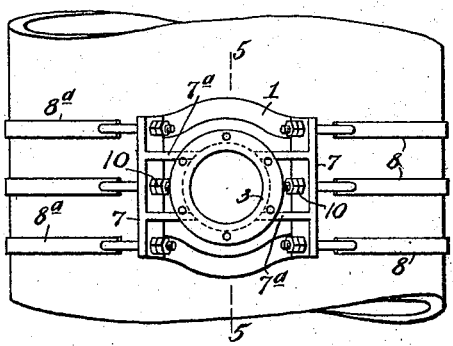
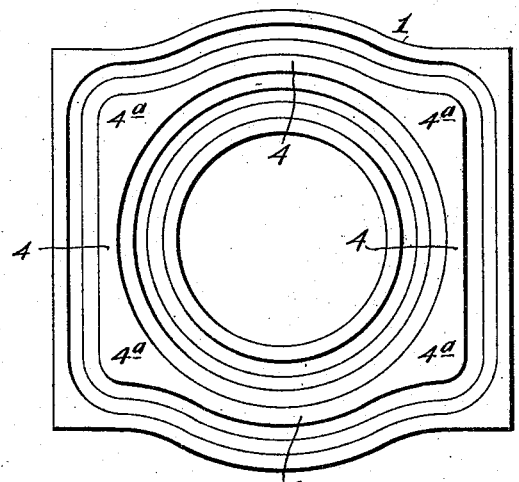
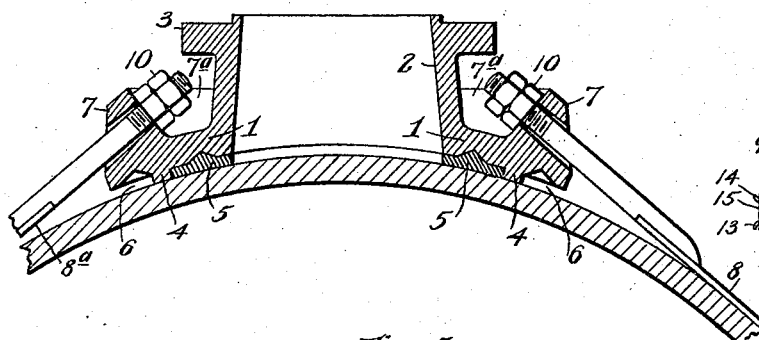
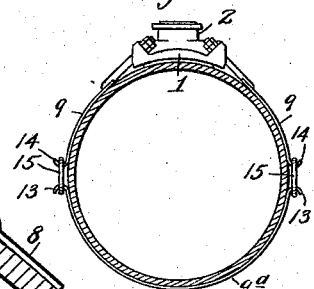
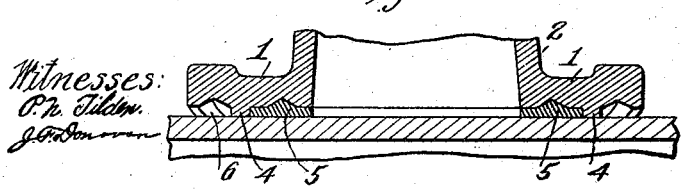

UNITED STATES PATENT OFFICE.

DENIS F. O'BRIEN, OF NEWARK, NEW JERSEY.

BRANCH-PIPE CONNECTION.

1,185,927.   Specification of Letters Patent.   Patented June 6, 1916.

Application filed November 6, 1913. Serial No. 799,471.

*To all whom it may concern:*

Be it known that I, DENIS F. O'BRIEN, a citizen of the United States, residing at Newark, county of Essex, and State of New Jersey, have invented certain new and useful Improvements in Branch-Pipe Connections, fully described and represented in the following specification and the accompanying drawings, forming a part of the same.

This invention relates to improvements in branch pipe connections, and particularly a connection for use when tapping mains or other containers under pressure.

The object of the invention is to provide a branch pipe connection which will make a solid contact with the main or other container to be tapped while at the same time permitting the joint to be calked interiorly so that the calking material will be held in place under pressure of the fluid in the branch pipe. In addition, an emergency calking space is provided.

With the above object in view and some others which will be obvious to those skilled in the art from the description hereinafter, the invention consists in the features, details of construction and combination of parts which will first be described in connection with the accompanying drawings and then particularly pointed out.

In the drawings, Figure 1 is a cross-sectional view partly in elevation of a branch-pipe connection embodying this invention in place on a main; Fig. 2 a plan view of the same; Fig. 3 an enlarged detail sectional view of the saddle portion and the tubular connection showing the internal calking in place; Fig. 4 a bottom plan view of the saddle portion; Fig. 5 a section on the line 5—5, Fig. 2; and Fig. 6 a side elevation showing a modified form of detachable attaching means.

Referring to the drawings, it will be noted from Fig. 1 that the branch pipe connection comprises a saddle portion 1 of relatively considerable extent in the direction of the circumference of the main to be tapped, a relatively short tubular connection 2 extending from the saddle portion, and means for attaching the saddle portion to the main or other container which is to be tapped. In the best embodiment of the invention, the tubular connection and the saddle portion are formed in one piece, the outer end of said tubular connection being suitably formed for connection with a valve or pipe, as, for example, by providing said outer end of the tubular connection with a flange 3, Fig. 1. In the example illustrated, the interior of the tubular connection is tapered,—that is to say, increases in diameter from the outer end of the tubular connection toward its inner end, for reasons hereinafter explained. From the under surface of the saddle portion projects a bearing rib, indicated at 4, this rib entirely inclosing or surrounding the tubular connection and being arranged exteriorly of the same. This bearing rib 4 has its bearing surface located in a curved surface forming part of a cylinder concentric with the outer periphery of the main or other receptacle to be tapped so that the bearing rib will fit closely to the surface of such main.

In the best embodiment of the invention as shown in Fig. 4, the outer lateral face of the rib follows generally the contour of the outer edge of the saddle portion while the inner lateral face of the said rib follows generally the circular form of the tubular connection. By this arrangement, the rib is considerably wider at the four corner portions, which wider portions make a strong, solid bearing, thus distributing the strain over a considerable area of the main, instead of concentrating it on a narrow rib or surface. This is particularly advantageous when large branch connections are to be used with large mains, because in such cases the lateral strains on the saddle portion are relatively great. In Fig. 4 the wider corner portions are indicated at 4ª. The lower surface of the saddle portion proper is held away from the periphery of the main by the rib, so as to form rabbets which serve as calking spaces between the main and said lower surface of the saddle portion, one of these calking spaces being inside the rib and the other outside the rib. The interiorly arranged calking space is generally of a circular form and its upper wall is recessed in any suitable way. Furthermore, this interior calking space is open to the interior of the tubular connection, so that when the branch pipe connection is firmly fixed in place, molten lead or other suitable material may be cast in place into said calking space from the interior of the tubular connection, the molten metal filling the said calking space and the recess in its upper wall. Such a calking material is indicated in place at 5, Figs.

3 and 5. After the said packing is cast, it may be calked from the inside of the tubular connection, the enlargement of the interior diameter of the latter allowing sufficient room for this purpose.

It is to be noted that the interior calking-chamber has a general slope transversely away from the center of the tubular connection, which allows the molten metal to flow more readily into close contact with the rib 4. The calking space outside the rib 4 is an emergency space intended to be calked only in cases where the interior calking by some mischance, such as the shifting of the saddle on the main or otherwise, commences to leak. This outer space is open to the outside of the saddle and may also be provided with a recess in its upper wall. This outer calking space is indicated at 6, Fig. 4. Any suitable means may be employed for attaching the branch pipe connection to the main or other container to be tapped. In the best embodiment of the invention, the saddle portion is provided with upturned flanges 7, along its two longitudinal edges, the inside faces of these flanges being approximately radial to the main. Each flange is provided with a plurality of holes through which are passed the ends of draw-bands, each draw-band consisting of a plurality of sections, as indicated at 8, 8$^a$, Fig. 1, or 9, 9$^a$, Fig. 6. For the purpose of strengthening the branch pipe connection, ribs 7$^a$ extend from the tubular connection 2 to the flanges 7, as shown in Fig. 2. The draw-bands have their ends threaded and provided with nuts 10, as shown.

In the form of draw-band shown in Fig. 1, each section has an enlarged end which is turned radially and under-cut, so that the two ends together constitute a dovetail as indicated in Fig. 1 at 11, over which is placed a correspondingly shaped clamp 12, whereby the two sections of the draw-band are firmly united when drawn tight, but may be readily separated when the strain is relieved.

In the form of draw-band shown in Fig. 6, which is the best embodiment of the invention, each draw-band is made in three sections, the central portion being semicircular and having its two ends bent outward and downward to form hooks, as indicated at 13. The other two sections of each draw-band are provided with hooks as indicated at 14 and the respective hooks 13 and 14 are connected by links 15. This is particularly advantageous in that the connections of the sections of the draw-bands are readily accessible from the top of the main.

The manner of using the device is obvious but may be briefly described as follows: The saddle portion is placed upon the main to be tapped. The draw-bands are then put in place and drawn tight, so that the saddle is firmly clamped against the main. Lead or the like material is then cast into the interior calking space by manipulations carved out in the interior of the tubular connection 2 as by forming a suitable dam of clay or the like and casting the molten soft metal into the space. The said soft metal when solidified may be calked with a suitable tool from the interior of the tubular connection, if this be necessary. The device is then ready for the attachment of the valve and drilling apparatus, of any usual kind, to the outer end of the tubular connection 2, as by connecting the valve to the flange 3 in the usual way. If, after the completion of the tapping apparatus and the inlet of fluid under pressure to the interior of the tubular connection, it is found that the joint between the saddle and the main is leaky, as sometimes occurs as a result of rough work in tapping the main, it is possible to calk the emergency calking space from the outside of the saddle in any suitable way, as for example by building a clay dam outside the saddle and casting molten metal into said calking space, which metal, when solidified, may be calked in the usual way from the outside. With ordinary care, however, the interior calking space will suffice to make a tight joint, and as the soft metal is pressed outward against the rib by the pressure of fluid within the tubular connection, the tendency is to tighten the joint.

What is claimed is:—

1. A branch pipe connection comprising a saddle portion and a tubular connection projecting therefrom, said saddle portion having a single projecting rib arranged to fit against the main which is to be tapped, said rib lying intermediate the inner wall of the tubular connection and the outer edge of the saddle portion and surrounding the said inner wall, whereby the under surface of the saddle portion is held away from the main to form a calking-chamber opening into the interior of the tubular connection, and a calking-chamber outside said rib and opened exteriorly, and means for attaching the saddle portion to the main.

2. A branch pipe connection comprising a saddle portion and a tubular connection projecting therefrom, said saddle portion having a single projecting rib arranged to fit against the main which is to be tapped, said rib lying intermediate the inner wall of the tubular connection and the outer edge of the saddle portion and surrounding the said inner wall whereby the under surface of the saddle portion is held away from the main, said saddle portion having a recessed surface lying inside the rib and a recessed surface lying outside the rib, to form calking-chambers, one of which opens into the interior of the tubular connection and the other opens to the outside of the saddle portion, and means for attaching the saddle portion to the main.

3. A branch pipe connection comprising a saddle portion and a tubular connection projecting therefrom, the interior diameter of said tubular connection being smallest at its outer end and increasing from the outer end toward the saddle portion, means outside the tubular connection and back from the outer edge of the saddle portion for holding the under surface of the saddle portion out of contact with the main to be tapped, whereby a calking space is formed inside said means and accessible from the interior of the tubular connection and a packing space is formed outside said means and accessible from the exterior of the saddle portion, and means for detachably connecting the saddle portion to the main.

4. A branch pipe connection comprising a saddle portion and a tubular connection projecting therefrom, said saddle portion having a rabbet at its inner margin opening to the interior of the tubular connection and also having a rabbet at its outer margin opening exteriorly, the face of the saddle portion intermediate said rabbets being formed to contact with a main.

5. A branch pipe connection comprising a saddle portion and a tubular connection projecting therefrom, said saddle portion having an exterior margin generally oblong, an annular rabbet at its inner margin extending to the inner wall of the tubular connection and a rabbet at the lower face of the exterior margin extending to the outer edge of the saddle portion, the face of the saddle intermediate said rabbets being formed to contact with a main and being wider toward the four corner portions of the saddle portion.

In testimony whereof, I have hereunto set my hand, in the presence of two subscribing witnesses.

DENIS F. O'BRIEN.

Witnesses:
  J. A. GRAVES,
  P. N. TILDEN.

Copies of this patent may be obtained for five cents each, by addressing the "Commissioner of Patents, Washington, D. C."